United States Patent [19]

Mizoguchi

[11] Patent Number: 5,394,110

[45] Date of Patent: Feb. 28, 1995

[54] DEMODULATION SYSTEM HAVING ADAPTIVE MATCHED FILTER AND DECISION FEEDBACK EQUALIZER

[75] Inventor: Shoichi Mizoguchi, Tokyo, Japan

[73] Assignee: NEC Corporation, Tokyo, Japan

[21] Appl. No.: 190,453

[22] Filed: Feb. 2, 1994

[30] Foreign Application Priority Data

Feb. 2, 1993 [JP] Japan ................... 5-015416

[51] Int. Cl.[6] ............................................. H03H 7/30
[52] U.S. Cl. ....................................... 329/304; 329/318; 375/230; 375/232
[58] Field of Search ................ 329/304, 310, 318, 319, 329/320; 375/14, 11, 12, 15

[56] References Cited

U.S. PATENT DOCUMENTS

| | | | |
|---|---|---|---|
| 5,321,723 | 6/1994 | Mizoguchi | 375/14 |
| 5,331,663 | 7/1994 | Kurokami | 375/14 |

FOREIGN PATENT DOCUMENTS

| | | |
|---|---|---|
| 0501449 | 9/1992 | European Pat. Off. |
| 4-271508 | 9/1992 | Japan. |
| 4-77106 | 11/1992 | Japan. |
| 2238932 | 6/1991 | United Kingdom. |

OTHER PUBLICATIONS

Patent Abstracts of Japan, vol. 16, No. 294 (E-1225), Jun. 29, 1992.
Corrales et al., "A Technique for Minimum/-Non-Minimum Phase Identification During Multipath Fading", IEEE Global Telecommunications Conference, Globecom '90, Dec. 2-5, 1990, pp. 1203-1208.

*Primary Examiner*—Siegfried H. Grimm
*Attorney, Agent, or Firm*—Sughrue, Mion, Zinn, Macpeak & Seas

[57] ABSTRACT

In a modulation system, a demodulator demodulates an intermediate frequency modulated signal and outputs an analog-baseband signal, and an analog-digital converter analog-digital converts this baseband signal. An adaptive matched filter inputs the output of the analog-digital converter and makes symmetrical the impulse response of the propagation path. A decision feedback equalizer inputs the output of the adaptive matched filter and eliminates the intersymbol interference. A reset circuit judges the fading type using tap coefficients within the decision feedback equalizer, and stops the operation of the adaptive matched filter in cases of minimum phase shift type fading. The adaptive matched filter is constructed so as to operate in an intermediate frequency band as well as in a baseband.

4 Claims, 5 Drawing Sheets

DEMODULATION SYSTEM HAVING ADAPTIVE MATCHED FILTER AND DECISION FEEDBACK EQUALIZER

BACKGROUND OF THE INVENTION

1. Field of the Invention

The present invention relates to a demodulation system, and more particularly to a demodulation system including an automatic equalizer for use on the reception side of a digital radio communication system using a multilevel quadrature amplitude modulation (multilevel QAM) method or a polyphase modulation method.

2. Description of the Related Art

In recent years, digital radio communication systems have employed, on the reception side thereof, demodulation systems equipped with equalizers that use transversal filters for preventing deterioration in the signal quality due to frequency selective fading produced in propagation paths.

In particular, in a demodulation system in which a decision feedback equalizer is used as the equalizer, and moreover, an adaptive matched filter precedes the decision feedback equalizer, even within a range in which $\rho > 1$ ($\rho$ is the ratio of the amplitude of a reflected wave to the amplitude of a principal wave) where sufficient equalizing capability cannot be obtained solely through the use of a decision feedback equalizer, the same equalizing capabilities can be obtained as for the range $0 < \rho < 1$. Fading in the range $\rho > 1$ is fading in which an interference wave exists at a position advanced in time in relation to the principal signal and is referred to as non-minimum phase shift type fading. Fading in the range $0 < \rho < 1$ is fading in which an interference wave exists at a position delayed in time in relation to the principal signal, and is referred to as minimum phase shift type fading. This type of demodulation system is disclosed in an invention by the same inventor as the present invention, Japanese Patent Application Laid-open 92-271508, being the earlier application of U.S. Pat. application Ser. No. 07/842,422, which has issued as U.S. Pat. No. 5,321,723.

Figure 1:
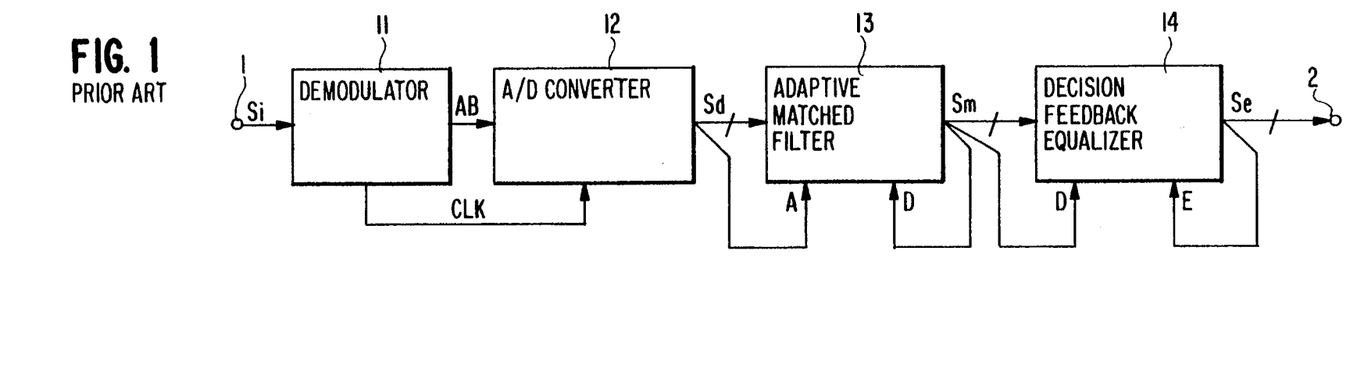
FIG. 1 is a block diagram showing the construction of an example of a demodulation system of the prior art having a decision feedback equalizer with an adaptive matched filter.

FIG. 1 shows the construction of a demodulation system of the prior art described above. An intermediate frequency band modulated signal Si is supplied to the input terminal 1. The input terminal 1 is connected to a demodulator 11. The demodulator 11 demodulates the modulated signal Si and outputs an analog baseband signal AB. The analog baseband signal AB is supplied to an analog-digital (A/D) converter 12. A clock signal CLK is also supplied to the A/D converter 12 from the demodulator 11. The A/D converter 12 uses the clock signal CLK to sample-quantize the analog-baseband signal AB and output an M-bit parallel digital signal Sd. This M-bit parallel digital signal Sd is supplied to an adaptive matched filter 13. A polarity signal A is included within the M-bit signal Sd. A polarity signal D is included within the signal outputted by the adaptive matched filter 13. The adaptive matched filter 13 includes a transversal filter (not shown). The adaptive matched filter 13, by controlling the transversal filter within it by tap coefficients which were generated by time-averaging and correlating the polarity signal A and the polarity signal D, can make symmetrical the impulse response of the propagation path. As a result, non-minimum phase shift type fading as well as minimum phase shift type fading can be split into two types of fading having substantially equal interference before and after in time relative to the principal signal. In this case, the amount of interference in each of the two types of fading split in this manner is less than the amount of interference of fading of a signal inputted to the adaptive matched filter 13. In any case, the adaptive matched filter 13 outputs as its output signal a matched signal Sm including the above-described polarity signal D.

Matched signal Sm is supplied to a decision feed-back equalizer 14. An error signal E is included within an output signal from the decision feedback equalizer 14. This error signal E indicates the polarity of divergence from the predetermined value of post-equalizing signal Se. The decision feedback equalizer 14 includes a decision feedback transversal filter (to be described hereinafter). The decision feedback equalizer 14, by controlling the decision feedback transversal filter within it by tap coefficients obtained by time-averaging and correlating the polarity signal D and the error signal E, can eliminate intersymbol interference that occured in fading.

Figure 2:
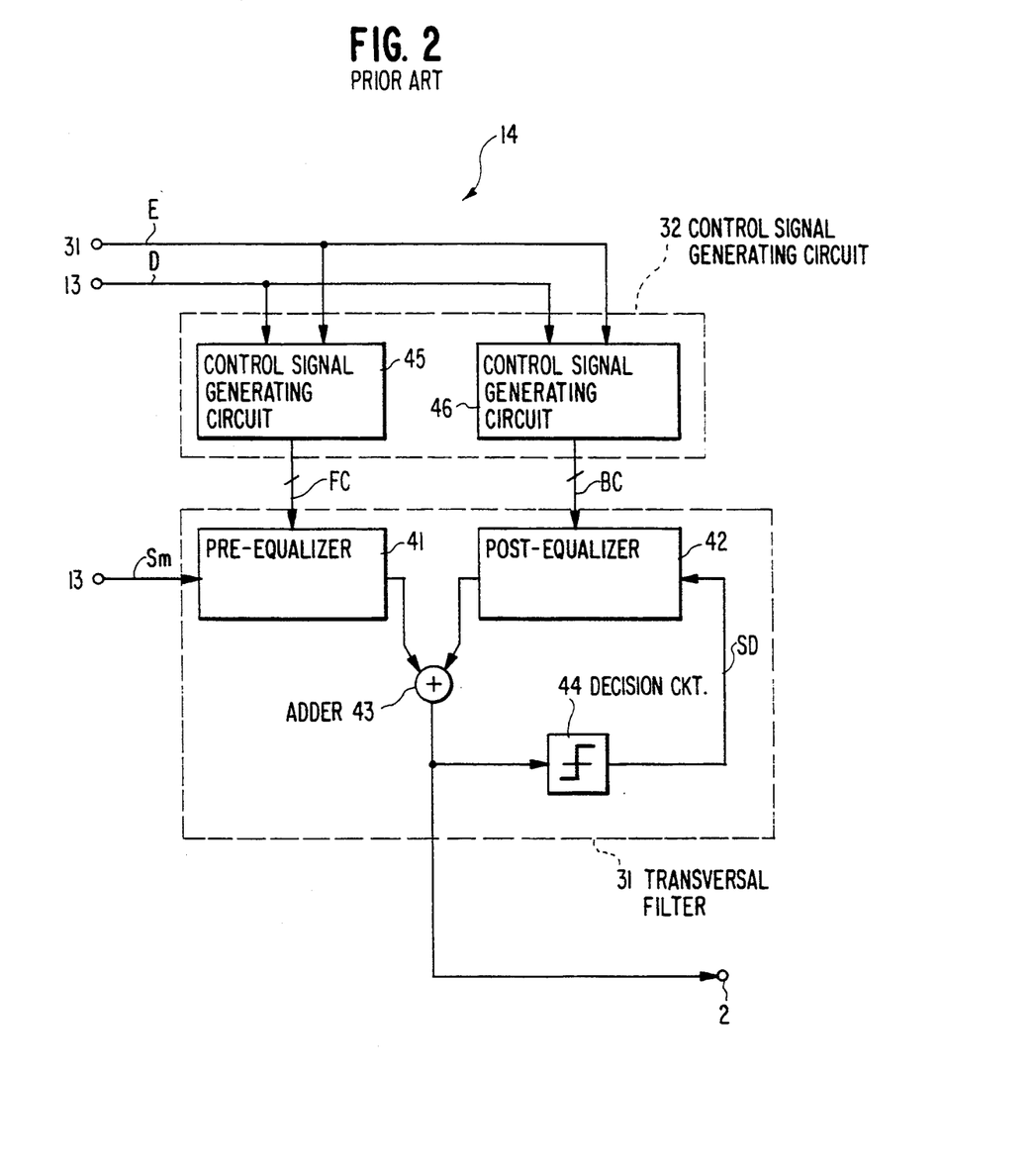
FIG. 2 is a block diagram showing the construction of the decision feedback equalizer 14 of FIG. 1.

FIG. 2 shows the detailed structure of the decision feedback equalizer 14. The decision feedback equalizer 14 has a decision feedback transversal filter 31, and a control signal generating circuit 32. The transversal filter 31 is composed of a pre-equalizer 41, a post-equalizer 42, an adder 43, and a decision circuit 44. The control signal generating circuit 32 has a control signal generating circuit 45 for the pre-equalizer and a control signal generating circuit 46 for the post-equalizer. The pre-equalizer 41 has the capability to eliminate interference waves advanced in time relative to the principal signal, and the post-equalizer 42 has the capability of eliminating interference waves that were delayed in time relative to the principal signal. In particular, because the post-equalizer 42 takes as its input signal the equalized decision signal SD and eliminates interference waves based on this decision signal SD, virtually all interference can be eliminated.

Figure 3:
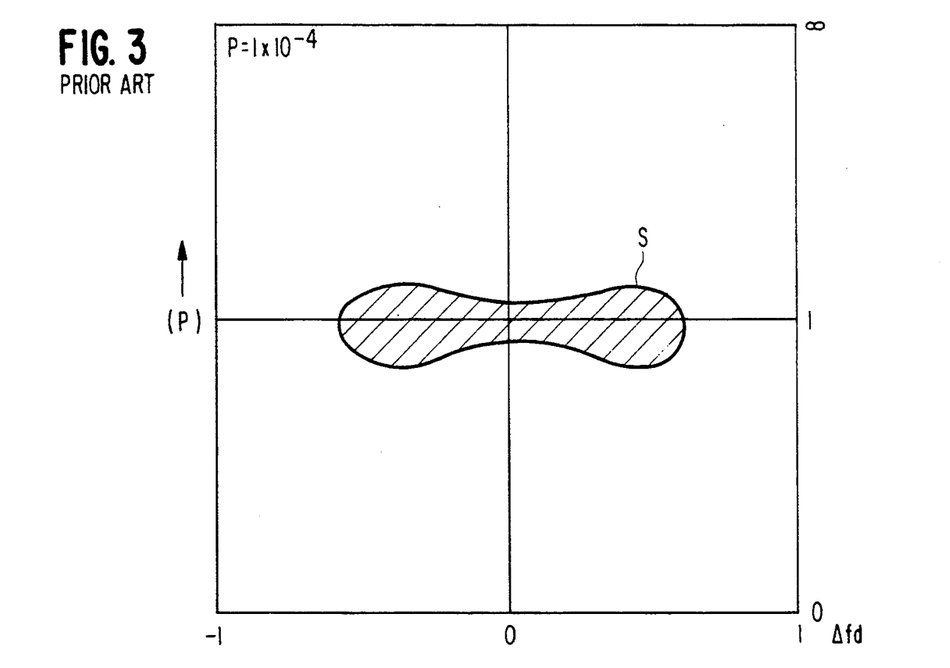
FIG. 3 shows signature characteristics of the demodulation system of FIG. 1.

FIG. 3 shows equalizing characteristics for two-ray fading of a decision feedback equalizer with the adaptive matched filter described above. FIG. 3 shows what is referred to as signature characteristics, the horizontal axis showing notch position $\Delta fd$ which is the shift of fading notch frequency from the center of the modulation spectrum of a desired signal, the shift being normalized by the clock frequency, and the vertical axis showing the amplitude ratio $\rho$ which is the amplitude of the reflected wave (delayed wave) normalized by the amplitude of the principal wave. The notch depth Dn is expressed by $Dn = -20 \log (1-\rho)$dB. Using notch position fd and amplitude ratio $\rho$ as parameters, curve S is plotted by interconnecting points fd and $\rho$ where error ratio $P = 1 \times 10^{-4}$. Error ratio P is greater than $10^{-4}$ in the area that is surrounded by curve S in FIG. 3. Therefore, it can be understood that the smaller the area surrounded by curve S, the greater the ability of the equalizer. The signature curve S shown in FIG. 3 shows that equalizing is possible outside the vicinity of $\rho = 1$.

Figure 4:
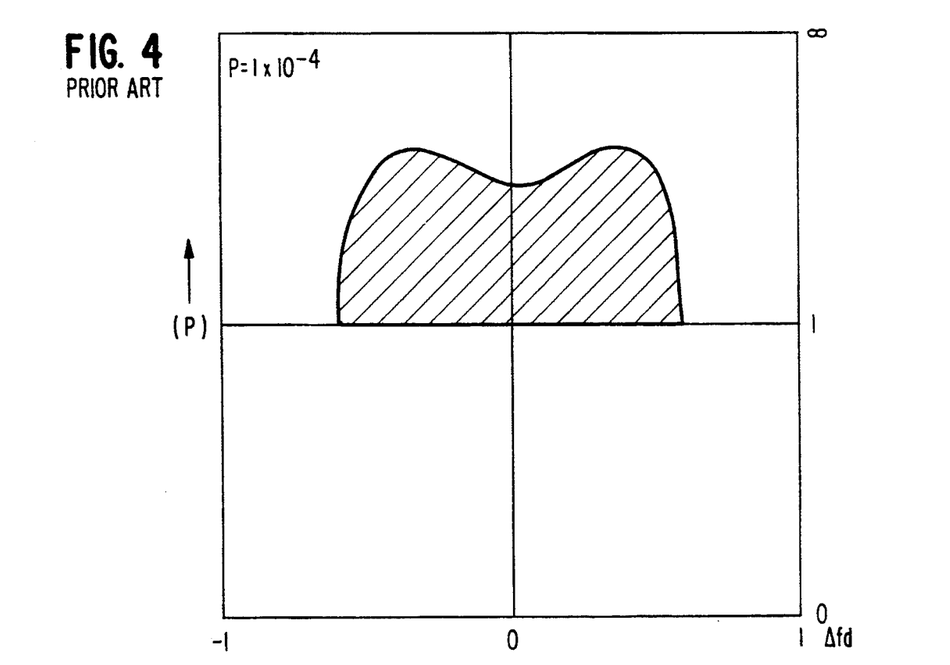
FIG. 4 shows signature characteristics of a demodulation system of the prior art having only a decision feedback equalizer.

FIG. 4 shows the signature characteristics for a demodulation system equipped with only a decision feedback equalizer that does not use an adaptive matched filter. When $0 < \rho < 1$, interference waves exist only in delayed positions in time relative to the principal signal, and consequently, the post-equalizer 42 of the decision feedback equalizer 14 has sufficient effect to carry out complete equalizing. Because interference waves exist at advanced positions in time relative to the principal signal when $\rho>1$, the pre-equalizer 41 of the decision feedback equalizer 14 operates. However, because the pre-equalizer 41 is inputting signals distorted by fading, it lacks sufficient equalizing effect, and the signature characteristics when $\rho>1$ are poor. When an adaptive matched filter is added to the decision feedback equalizer, the signature characteristics for $\rho>1$ are improved as shown in FIG. 3.

Although a demodulation system of the prior art which is preceded by an adaptive matched filter as explained above has remarkably improved characteristics for fading in a range where $\rho>1$ as compared with a demodulation system equipped with only a decision feedback equalizer, such a system is problematic in that, for fading in a range where $0<\rho<1$, it has inferior signature characteristics compared with a demodulation system equipped with only a decision feedback equalizer.

SUMMARY OF THE INVENTION

The object of the present invention is to provide a demodulation system capable of further improving the equalizing characteristics of the above-described demodulation system of the prior, and particularly improving the equalizing characteristics of minimum phase shift type fading.

A demodulation system according to the first mode of the present invention comprises:

- a demodulator for demodulating to an analog-baseband signal an intermediate-frequency band modulated signal having intersymbol interference due to fading in propagation paths;
- an analog-digital converter for sampling-quantizing the analog-baseband signal and outputting it as a digital-baseband signal;
- an adaptive matched filter that includes a transversal filter for inputting the digital-baseband signal and a control signal generating circuit for supplying tap coefficients to the transversal filter, and which, according to control over the transversal filter by the control signal generating circuit using tap coefficients generated through correlation and time-average processing of a polarity signal indicating polarity of the digital-baseband signal and a polarity signal indicating polarity of the output signal of the transversal filter, makes symmetric an asymmetric impulse response within the inputted digital-baseband signal due to said fading in said propagation paths and outputs a matched signal;
- a decision feedback equalizer that includes a decision feedback transversal filter for inputting said matched signal from the adaptive matched filter and a control signal generating circuit for supplying tap coefficients to the decision feedback transversal filter, and which, according to control over the decision feedback transversal filter by the control signal generating circuit using tap coefficients generated through correlation and time-average processing of a polarity signal included in the inputted matched signal and an error signal within the signal outputted after equalizing, eliminates from the inputted signal inter-symbol interference due to said fading and outputs a signal after equalizing; and
- a reset circuit for fixing to predetermined values the tap coefficients of the adaptive matched filter when fading is judged to occur in the range $0<\rho<1$ ($\rho$ being the amplitude ratio of a delayed wave of fading to the principal wave) based on the tap coefficients of the decision feedback equalizer.

In addition, a demodulation system according to the second mode of the present invention comprises:

- an adaptive matched filter that includes a transversal filter for inputting the intermediate frequency band modulated signal having intersymbol interference due to fading in a propagation path, and a control signal generating circuit for supplying tap coefficients to the transversal filter, and which, according to control over the transversal filter by the control signal generating circuit using tap coefficients generated through correlation and time-average processing of a polarity signal indicating polarity of the intermediate frequency band modulated signal and a polarity signal indicating polarity of the output signal of the transversal filter, makes symmetric an asymmetric impulse response within the inputted intermediate frequency band modulated signal due to fading in propagation path and outputs a matched signal;
- a demodulator for receiving the matched signal and demodulating this signal to an analog-baseband signal;
- an analog-digital converter for sampling-quantizing the analog-baseband signal and outputting a digital-baseband signal;
- a decision feedback equalizer that includes a decision feedback transversal filter for inputting the digital-baseband signal from the analog-digital converter and a control signal generating circuit for supplying tap coefficients to the decision feedback transversal filter, and which, according to control over the decision feedback transversal filter by the control signal generating circuit using tap coefficients generated through correlation and time-average processing of a polarity signal included in the inputted matched signal and an error signal within the signal outputted after equalizing, eliminates from the inputted signal intersymbol interference due to fading and outputs a signal after equalizing; and
- a reset circuit for fixing to predetermined values the tap coefficients of the adaptive matched filter when fading is judged to occur in the range $0<\rho<1$ ($\rho$ being the ratio of amplitude of a reflected wave to the amplitude of a principal wave) based on the tap coefficient of the decision feedback equalizer.

The reset circuits included in each of the above-described demodulation systems monitor the tap coefficients supplied to each of the pre-equalizers and post-equalizers that make up the corresponding decision feedback transversal filters, and when the absolute value of a tap coefficient supplied to the post-equalizer is greater than the absolute value of a tap coefficient supplied to the pre-equalizer, judge that the fading is within the range $0<\rho<1$.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENTS

Embodiments of the present invention are explained below with reference to the figures.

Figure 5:
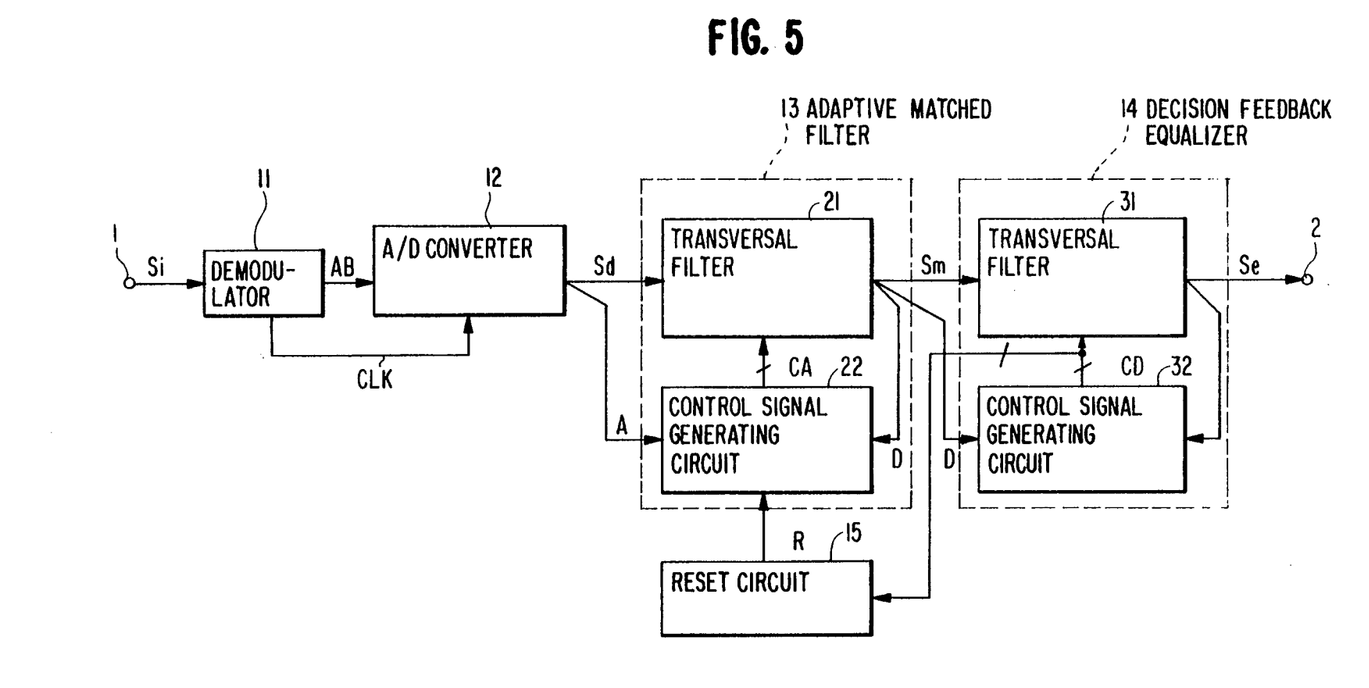
FIG. 5 is a block diagram showing the construction of a demodulation system according to the first embodiment of the present invention.

Referring to FIG. 5, the first embodiment of the demodulation system according to the present invention has the same construction as shown in FIG. 1 with the exception that it also includes a reset circuit 15. Accordingly, composing elements having the same function as those of the demodulation system shown in FIG. 1 are labeled with the same reference numerals and explanation of these elements will be omitted.

The adaptive matched filter 13 has a transversal filter 21 and a control signal generating circuit 22. A polarity signal bit A indicating the polarity of the original baseband signal which is the most significant bit (MSB) of the output signal train (digital-baseband signal) Sd of the A/D converter 12, and a polarity signal D which is the MSB of the output signal Sm of the transversal filter 21 are supplied to the control signal generating circuit 22. The control signal generating circuit 22 outputs tap coefficient CA through correlation and time-average processing of polarity signal bit A and polarity signal D. The transversal filter 21 is controlled by this tap coefficient CA and makes symmetrical the impulse response of the propagation path. The control signal generating circuit 22 is controlled by a control signal R outputted from a reset circuit 15 to be explained hereinafter. In other words, when a control signal R indicates fading in the range $0<\rho<1$, the control signal generating circuit 22 fixes the tap coefficient CA to a predetermined value (for example, only the main tap is 1, and other taps are 0), and outputs the tap coefficients to the transversal filter 21. On the other hand, when the control signal R indicates fading in the range $\rho>1$, the control signal generating circuit 22 does not fix the adaptive matched filter tap coefficient CA and performs the above-described normal adaptive control. Accordingly, the adaptive matched filter 13 performs adaptive operation and operates to make impulse response of the propagation path symmetrical only when fading occurs in the range $\rho>1$.

The outputted digital signal (matched signal) Sm of the adaptive matched filter 13 is supplied to the transversal filter 31 within the decision feedback equalizer 14. A polarity signal D which is the MSB of the inputted digital signal Sm of the decision feedback equalizer 14 and an error signal E that represents the polarity of divergence from the predetermined value of post-equalizing signal Se within the outputted signal of the decision feedback equalizer 14 are supplied to the control signal generating circuit 32. The control signal generating circuit 32 takes the correlation and time average of polarity signal D and error signal E and supplies tap coefficient CD to the transversal filter 31. In response to this tap coefficient CD, the transversal filter 31 outputs post-equalizing signal Se, which is a digital signal train from which inter-symbol interference has been eliminated, to output terminal 2. The operation of this decision feedback equalizer 14 is the same as in a device of the prior art. Consequently, as explained hereinabove, the decision feedback equalizer 14 can nearly completely equalize fading in the range $0<\rho<1$.

Figure 6:
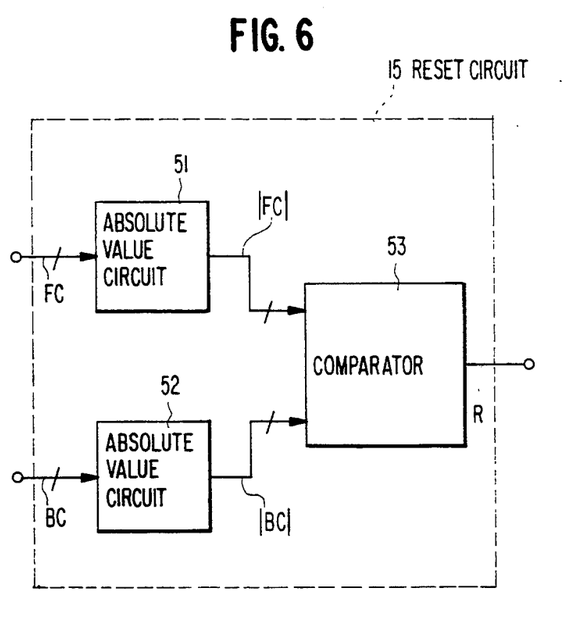
FIG. 6 is a block diagram showing the construction of the reset circuit 15 of FIG. 5.

A reset circuit 15 will next be explained with reference to FIG. 6. As shown in FIG. 5, the reset circuit 15 receives a tap coefficient CD from the decision feedback equalizer 14, and this tap coefficient CD is made up of a forward tap coefficient FC and a back tap coefficient BC (refer to FIG. 2). The reset circuit 15 comprises an absolute value circuit 51 for inputting the forward tap coefficient FC and outputting its absolute value $|FC|$, an absolute value circuit 52 for inputting the back tap coefficient BC and outputting its absolute value $|BC|$, and a comparator 53 for inputting and comparing the two absolute values $|FC|$ and $|BC|$.

A detailed explanation will next be given of the judging operation by the reset circuit 15 with reference to FIG. 2. When fading is $0<\rho<1$, as a rule, the absolute value $|BC|$ of the tap coefficient BC for the post-equalizer 42 becomes great, and the absolute value $|FC|$ of the tap coefficient FC for the pre-equalizer 41 approaches 0. When fading is $\rho>1$, the absolute value $|FC|$ of the tap coefficient FC for the preequalizer 41 becomes great and the absolute value $|BC|$ of the tap coefficient BC for the post-equalizer 42 approaches 0. Here, the comparator 53 compares the two inputted absolute values $|FC|$ and $|BC|$, and outputs as a control signal R either "1" when $|FC|<|BC|$, i.e., when the fading range is $0<\rho<1$, or "0" when $|FC|\geq|BC|$, i.e., when the fading range is $\rho>1$. The control signal generating circuit 22 of the adaptive matched filter 13 is controlled as described hereinabove according to this control signal R.

Figure 7:
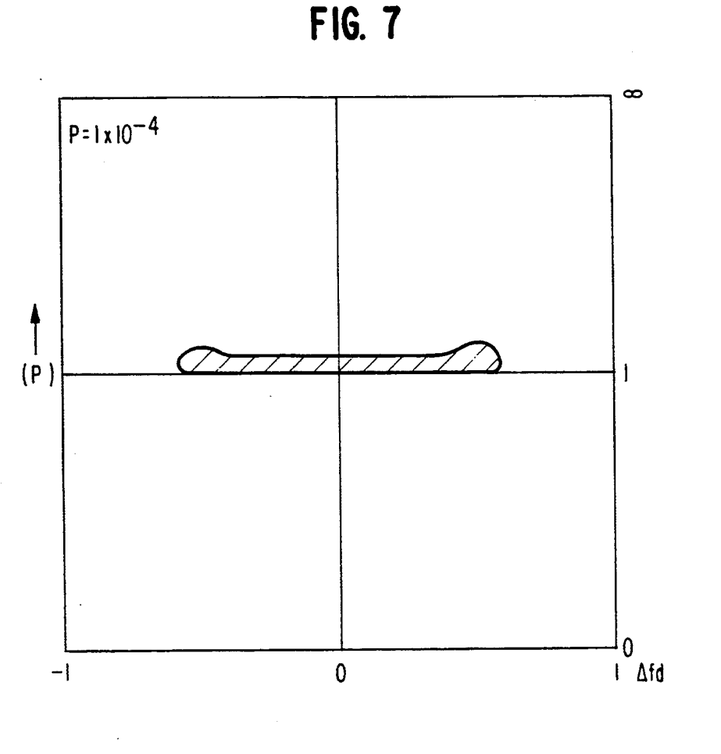
FIG. 7 shows signature characteristics of the modulation system of FIG. 5.

FIG. 7 shows the signature characteristics of the demodulation system according to the present invention. As described hereinabove, when fading occurs in the range $0<\rho<1$, the operation of the adaptive matched filter 13 stops. Consequently, fading for $0<\rho<1$ can be nearly completely equalized to produce the same signature characteristics as are produced by the decision feedback equalizer 14 alone.

In the case of fading occuring in the range $\rho>1$, the adaptive matched filter 13 operates. In this way, the interference wave advanced in time relative to the principal signal that occur when $\rho>1$ is split into one component that is advanced relatively to the principal signal and another component that is delayed, and the amount of interference in each of these components is reduced compared to the original amount of interference. As described hereinabove, the advanced interference waves are equalized by the pre-equalizer 41 in the transversal filter 31, and the delayed interference waves are equalized by the post-equalizer 42 in the transversal filter 31. Because the amount of interference of the advanced interference waves and the delayed interference waves is reduced by the adaptive matched filter 13, a remarkable improvement is achieved compared to a case in which the adaptive matched filter 13 is absent.

Compared with signature characteristics carried out by a decision feedback equalizer having an adaptive matched filter of the prior art, the demodulation system according to the present invention can obtain signature characteristics in which fading for $0<\rho<1$ has been completely equalized.

While the above-described first embodiment of the demodulation system is a fully digital form in which the adaptive matched filter 13 operates in a baseband, the demodulation system according to the present invention can also be applied to a case in which the adaptive matched filter operates on an intermediate-frequency band (IF band).

Figure 8:
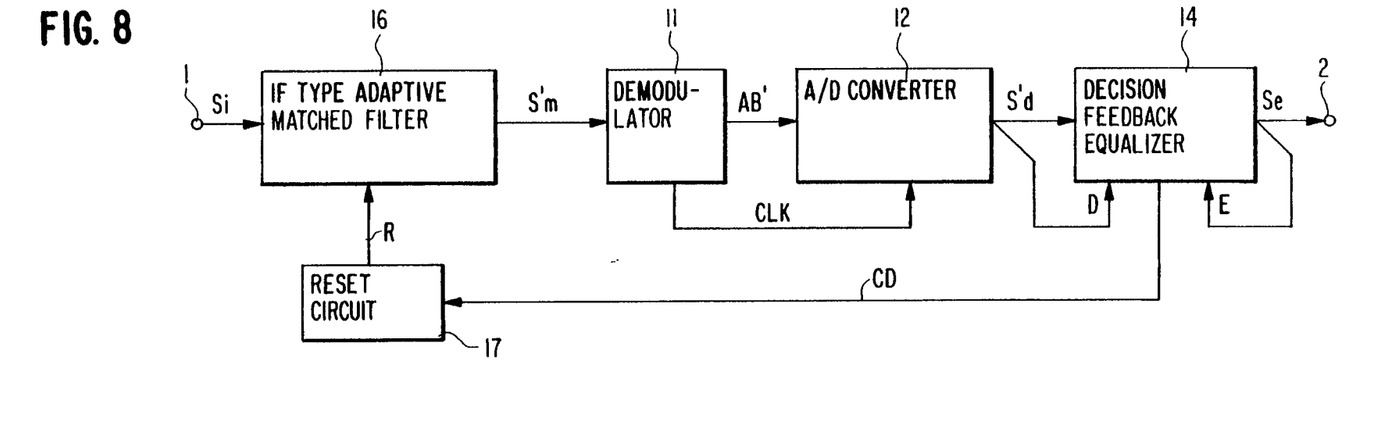
FIG. 8 is a block diagram showing the construction of a demodulation system according to the second embodiment of the present invention.

FIG. 8 shows a second embodiment of the demodulation system for such a case. An IF modulated wave Si inputted from an input terminal 1 is supplied to an IF adaptive matched filter 16 that operates on an IF band. The IF adaptive matched filter 16 is controlled by a reset circuit 17 explained hereinbelow, and stops operation for fading in the range $0<\rho<1$, and for fading in the range $\rho>1$, operates so as to make symmetrical the impulse response of the propagation path. The IF adaptive matched filter 16 has the same function as the above-described adaptive matched filter 13 of the first embodiment. A demodulator 11 demodulates this IF signal S' and outputs an analog-baseband signal AB'. This analog-baseband signal AB' is supplied to an analog-digital converter 12. A clock signal CLK is also supplied to the analog-digital converter 12 from the demodulator 11. The analog-digital converter 12 samples-quantizes the inputted analog-baseband signal AB' using the clock signal CLK and outputs digital signal train S'd as a digital baseband signal. The digital signal train S'd is supplied to a decision feedback equalizer 14. The decision feedback equalizer 14 eliminates intersymbol interference from the digital signal train S'd and outputs a digital signal train (post-equalizing signal) Se from output terminal 2.

Because the reset circuit 17 has the same function and construction as the reset circuit 15 included in the first embodiment, an explanation of its internal construction is omitted. The reset circuit 17 receives a tap coefficient CD from the decision feedback equalizer 14 and, based on the tap coefficient CD, determines whether fading is in the range $0<\rho<1$ or $\rho>1$. If fading occurs in the range $0<\rho<1$, the reset circuit 17 fixes, by means of a control signal R, the tap coefficient for the IF adaptive matched filter 16 to the predetermined value (for example, 1 for the main tap and 0 for other taps). If fading occurs in the range $\rho>1$, the reset circuit 17 uses the corresponding control signal to cause normal operation in the IF adaptive matched filter.

Accordingly, improved signature characteristics can be obtained also when the adaptive matched filter is composed of an IF band (FIG. 8).

As is clear from the above explanation, because the present invention involves a construction by which fading type is determined based on tap coefficients of a decision feedback equalizer, and operation of the adaptive matched filter stops when fading occurs in the range $0<\rho<1$, allowing the decision feedback equalizer to exercise sufficient equalizing effect, the invention provides the effect of complete equalizing of fading in the range $0<\rho<1$.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A demodulation system comprising:
   a demodulator for demodulating to an analog-baseband signal an intermediate frequency band modulated signal having intersymbol interference due to fading in propagation paths;
   an analog-digital converter for sampling-quantizing said analog-baseband signal and outputting it as a digital-baseband signal;
   an adaptive matched filter that includes a transversal filter for inputting said digital-baseband signal and a control signal generating circuit for supplying tap coefficients to the transversal filter, and which, according to control over the transversal filter by the control signal generating circuit using tap coefficients generated through correlation and time-average processing of a polarity signal indicating polarity of the digital-baseband signal and a polarity signal indicating polarity of the output signal of the transversal filter, makes symmetric an asymmetric impulse response within said inputted digital-baseband signal due to said fading in said propagation paths and outputs a matched signal;
   a decision feedback equalizer that includes a decision feedback transversal filter for inputting said matched signal from the adaptive matched filter and a control signal generating circuit for supplying tap coefficients to the decision feedback transversal filter, and which, according to control over the decision feedback transversal filter by the control signal generating circuit using tap coefficients generated through correlation and time-average processing of a polarity signal included in the inputted matched signal and an error signal within the signal outputted after equalizing, eliminates from the inputted signal intersymbol interference due to said fading and outputs a signal after equalizing; and
   a reset circuit for fixing to predetermined values said tap coefficients of the adaptive matched filter when fading is judged to occur in the range $0<\rho<1$ ($\rho$ being the ratio of the amplitude of a reflected wave to the amplitude of a principal wave) based on the tap coefficients of the decision feedback equalizer.

2. The demodulation system according to claim 1 wherein said reset circuit monitors tap coefficients supplied to each of the pre-equalizer and post-equalizer that make up said decision feedback transversal filter, and when the absolute value of a tap coefficient supplied to the post-equalizer is greater than the absolute value of a tap coefficient supplied to the pre-equalizer, judges that said fading is occuring within the range $0<\rho<1$.

3. A demodulation system comprising:
   an adaptive matched filter that includes a transversal filter for inputting an intermediate frequency band modulated signal having intersymbol interference due to fading in propagation paths, and a control signal generating circuit for supplying tap coefficients to the transversal filter, and which, according to control over the transversal filter by the control signal generating circuit using tap coefficients generated through correlation and time-average processing of a polarity signal indicating polarity of the intermediate frequency band modulated signal and a polarity signal indicating polarity of the output signal of the transversal filter, makes symmetric an asymmetric impulse response within the inputted intermediate frequency band modulated signal due to said fading in said propagation path and outputs a matched signal;

a demodulator for receiving said matched signal and demodulating this signal to an analog-baseband signal;

an analog-digital converter for sampling-quantizing said analog-baseband signal and outputting a digital-baseband signal;

a decision feedback equalizer that includes a decision feedback transversal filter for inputting said digital-baseband signal from the analog-digital converter and a control signal generating circuit for supplying tap coefficients to the decision feedback transversal filter, and which, according to control over the decision feedback transversal filter by the control signal generating circuit using tap coefficients generated through correlation and time-average processing of a polarity signal included in the inputted matched signal and an error signal within the signal outputted after equalizing, eliminates from the inputted signal intersymbol interference due to said fading and outputs a signal after equalizing; and a reset circuit for fixing to predetermined values said tap coefficients of the adaptive matched filter when fading is judged to occur in the range $0<\rho<1$ ($\rho$ being the ratio of the amplitude of a reflected wave to the amplitude of a principal wave) based on the tap coefficients of the decision feedback equalizer.

4. The demodulation system according to claim 3 wherein said reset circuit monitors tap coefficients supplied to each of the pre-equalizer and post-equalizer that make up said decision feedback transversal filter, and when the absolute value of a tap coefficient supplied to the post-equalizer is greater than the absolute value of a tap coefficient supplied to the pre-equalizer, judges that said fading is occuring within the range $0<\rho<1$.

* * * * *